United States Patent [19]

Hanson et al.

[11] Patent Number: 4,754,439
[45] Date of Patent: Jun. 28, 1988

[54] MEANS FOR OBTAINING SHEAR WAVE VELOCITIES

[75] Inventors: Kenneth E. Hanson, Broken Arrow; Leon A. Thomsen, Tulsa; Carl H. Sondergeld, Broken Arrow; Chandra S. Rai, Tulsa, all of Okla.

[73] Assignee: Amoco Corporation, Chicago, Ill.

[21] Appl. No.: 797,715

[22] Filed: Nov. 13, 1985

[51] Int. Cl.$^4$ .............................................. G01V 1/40
[52] U.S. Cl. ........................................ 367/31; 181/102
[58] Field of Search .......................... 367/25, 26, 31, 75; 181/102; 73/151, 152; 252/8.514, 8.504, 8.551

[56] References Cited

U.S. PATENT DOCUMENTS

| | | | |
|---|---|---|---|
| 3,126,976 | 3/1964 | Cordell et al. | 367/25 |
| 4,108,779 | 8/1978 | Carney | 252/8.515 |
| 4,549,630 | 10/1985 | Brown | 367/75 |
| 4,575,830 | 3/1986 | Ingram et al. | 367/26 |
| 4,611,685 | 9/1986 | Curran | 181/102 |

Primary Examiner—Thomas H. Tarcza
Assistant Examiner—Ian J. Lobo
Attorney, Agent, or Firm—S. H. Brown; F. E. Hook

[57] ABSTRACT

The present invention provides a method of logging a subterranean formation through a wellbore containing a fluid, wherein no shear wave signal is obtainable utilizing conventional sonic well logging tools suspended in the wellbore. The shear wave signal is not obtainable usually because the acoustic velocity of the wellbore fluid is greater than the shear wave velocity of the formation to be logged. In the present method, the acoustic velocity of the wellbore fluid is adjusted until a shear velocity signal is obtainable by lowering the acoustic velocity of the wellbore fluid until it is less than the shear wave velocity of the formation. Thereafter, the formation is logged through the wellbore to obtain a shear wave signal.

2 Claims, 4 Drawing Sheets

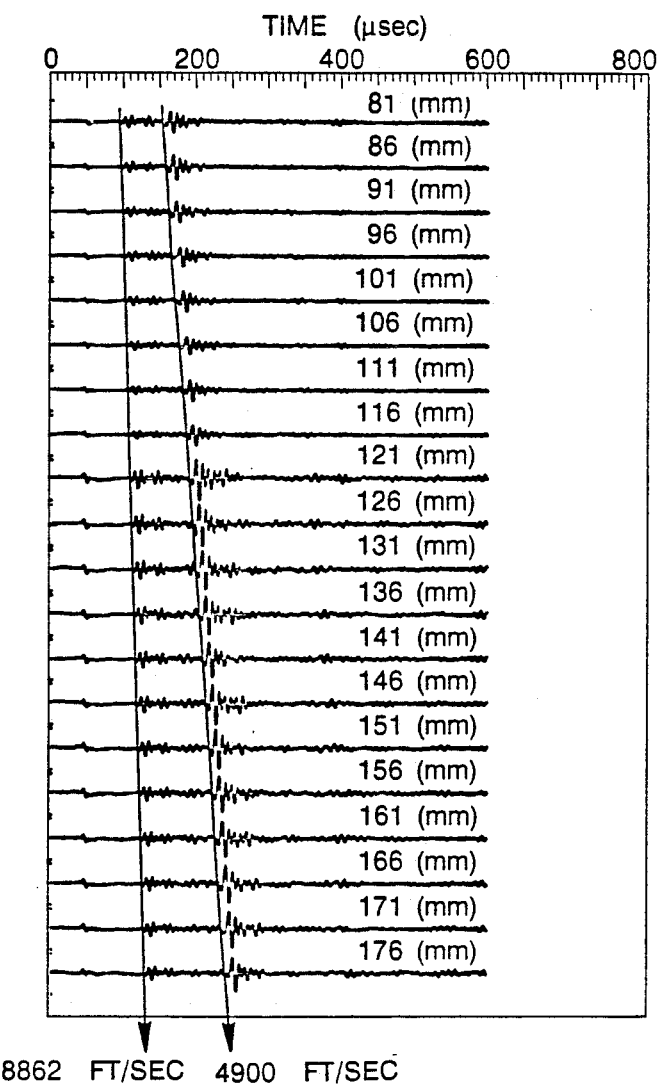
FIG.1A    MINERAL OIL

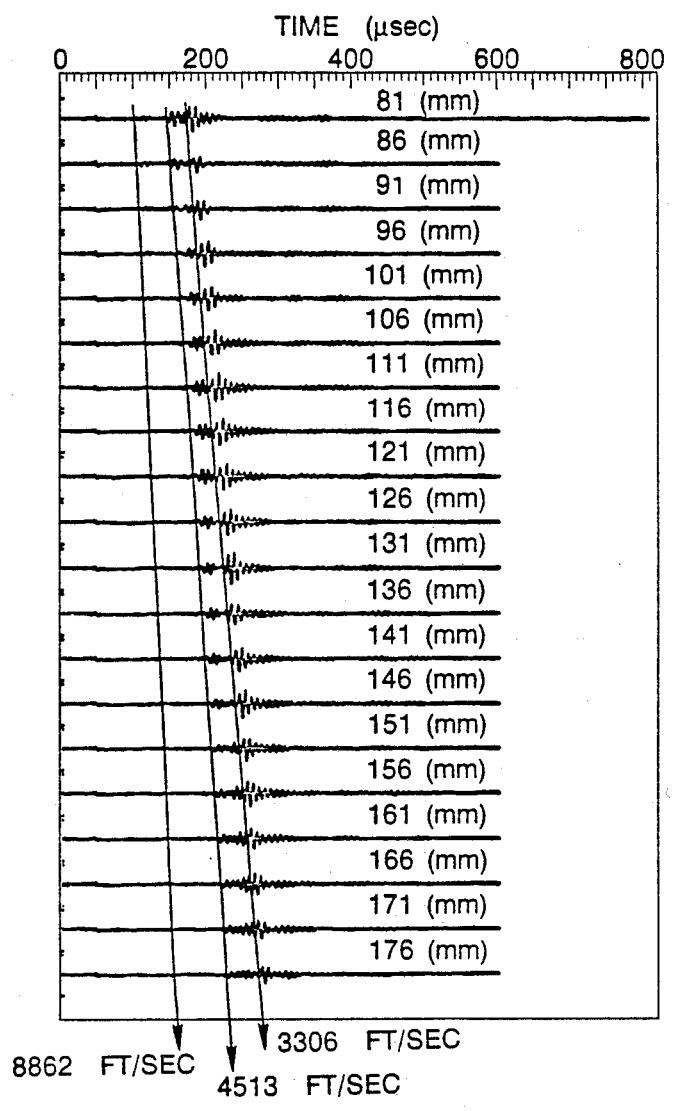
FIG.1B PENTANE

MEANS FOR OBTAINING SHEAR WAVE VELOCITIES

BACKGROUND OF THE INVENTION

1. Field of the Invention

The present invention relates to methods for obtaining shear wave velocities and, more particularly, to a method for obtaining by wellbore measurements shear wave velocities in formations where the formation shear wave velocity is less than the acoustic velocity of the fluid conventionally used within the wellbore.

2. Setting of the Invention

Sonic wave train logging is used to obtain compressional and shear wave velocity information for seismic exploration and geologic evaluation purposes. This logging technique often utilizes sonic frequencies of about 5 to 50 kHz and also often utilizes acoustic monopole source and receiver arrays placed within a wellbore. Source and receiver arrays are utilized to measure the formation's elastic properties via acoustic-elastic energy mode conversions at the wellbore fluid-formation interface. The sonic or acoustic monopole energy transmitting device generates acoustic compressional waves, which are converted at the borehole wall to both compressional and shear elastic waves critically refracted in the formation.

A problem often encountered in the field is that the formation to be logged has a shear wave velocity which is less than the acoustic velocity of the fluid within the wellbore. In such instances, as is well known, no critically refracted formation shear wave is generated via the acoustic-elastic mode conversion at the wellbore fluid-formation interface, thus no shear wave can be detected by the receivers.

Various solutions to this important problem have been proposed. One approach is to place acoustic, multipole source-receiver arrays in the wellbore which directly impart and sense shearing motion at the wellbore wall without relying upon acoustic elastic mode conversion. A problem with using such multipole source-receiver arrays is the requirement of azimuthal alignment and centering of the receivers and the transmitters.

Another approach relies upon other modes of borehole acoustic energy propagation, such as Stoneley or "tube-waves". These waves are generated even when the formation shear velocity is less than the borehole fluid velocity and can be recorded and analyzed to infer formation shear velocity via known theoretical relationships. The analysis procedures used to "back out" the formation shear velocity from the Stoneley or "tube-waves" are computationally intensive and, thus, it is difficult to generate the shear wave velocity on a "real time" basis while logging. This "real time" generation of the signals is extremely important in the timely utilization of the logging information. Further, these computational methods to back out the shear velocity require exceptionally good data quality to yield stable numerical results.

All of the above-described approaches for solving the problem require either extensive modifications to the tools normally utilized in the field, or extensive and expensive computing capability. The inventors hereof know of no reference that discloses or suggests intentionally altering the acoustic velocity properties of the wellbore fluid to solve the above problem.

SUMMARY OF THE INVENTION

The present invention provides a method for logging a subterranean formation traversed by a wellbore containing a fluid. In the method, the formation is logged from within the wellbore to obtain a signal representative of the shear velocity of the formation. If no shear velocity signal is obtainable because the acoustic velocity of the fluid is greater than the formation shear wave velocity, the acoustic velocity of the wellbore fluid is adjusted until the shear velocity signal is obtainable. Thereafter, the formation is logged from within the wellbore to obtain a signal representative of the shear velocity of the formation. In the implementation of the present invention, the fluid within the wellbore is altered or adjusted to lower the acoustic velocity of that fluid by: removing the fluid from the wellbore and replacing it with a different fluid having a lower acoustic velocity, or by adding components to the wellbore fluid to lower its acoustic velocity. Obviously, the components added to the wellbore fluid to lower the fluid's acoustic velocity should not also significantly alter the density of the fluid (i.e. its capability of suppressing or holding the formation fluids and gases within the formation to prevent blowout), or other critical physical and chemical aspects of the fluid.

BRIEF DESCRIPTION OF THE DRAWINGS

FIG. 1a is a graphical representation of the acoustic amplitude response in a test borehole in lucite, filled with mineral oil.

FIG. 1b is a graphical representation of the acoustic amplitude response in a test borehole in lucite, filled with pentane.

DETAILED DESCRIPTION OF THE PREFERRED EMBODIMENT

Figure 2:
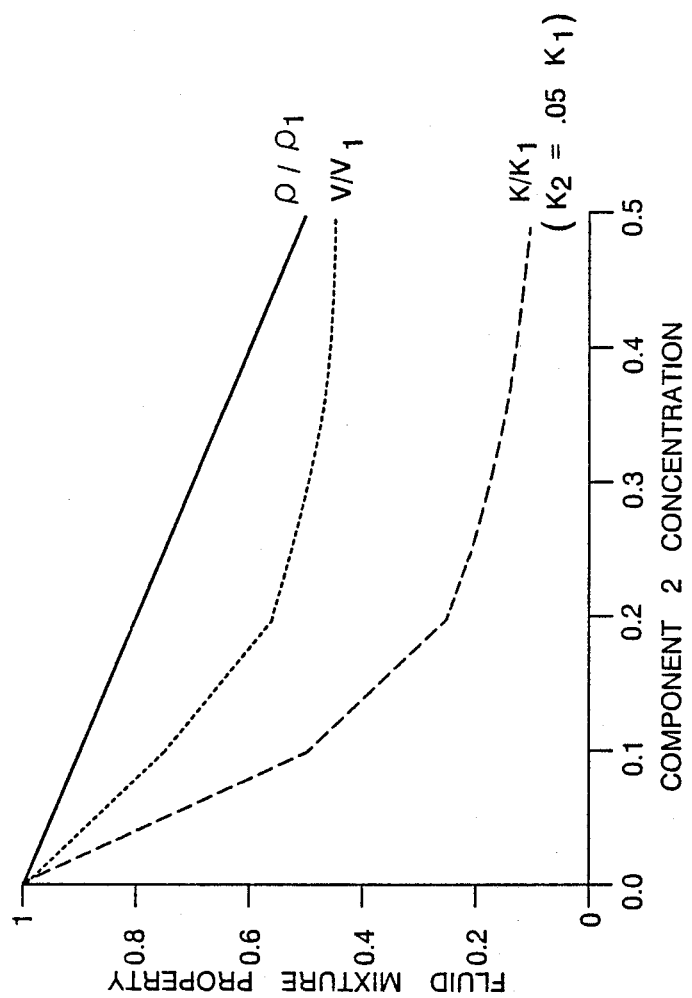
FIG. 2 is a graphical representation of fluid mixture properties ($\rho$, V, K) versus component concentration.

The present invention is a method for logging a subterranean formation traversed by a wellbore containing a fluid. In the method, the formation is logged from within the wellbore to obtain a signal representative of the shear velocity of the formation. If no shear velocity signal is obtainable the acoustic velocity of the wellbore fluid is altered until a shear velocity signal is obtainable. Thereafter, the formation is relogged from within the wellbore to obtain a signal representative of the shear velocity of the formation.

In the present invention, the wellbore fluid is either totally removed from the wellbore and replaced with a different fluid having an acoustic velocity less than the shear wave velocity of the formation, or a portion of the wellbore fluid is replaced in an isolated interval opposite the formation to be logged, or additives (either gaseous or liquid, and/or particulate material) are introduced into the wellbore fluid so that the acoustic velocity of the resulting wellbore fluid mixture is reduced to below the formation shear wave velocity. This reduction of the acoustic velocity is accomplished without significantly altering the other engineering properties of the fluid.

The results of a laboratory experiment demonstrating proof of this concept are set forth in FIGS. 1a and 1b. In the experiment, a borehole is drilled in a block of lucite (having compressional velocity of 8862 ft/sec. and shear velocity of 4513 ft/sec.). The borehole is filled with mineral oil, having an acoustic velocity of approximately 4900 ft/sec, i.e. faster than the shear velocity of the lucite. A small-scale acoustic source-receiver monopole array is placed within the mineral oil-filled borehole and the acoustic source is activated. As can be shown in FIG. 1a, no refracted shear wave arrival propagating in the lucite is detected.

Next, the same lucite borehole is filled with pentane, having an acoustic velocity of 3306 ft/sec., i.e., lower than the shear velocity of the lucite. The same acoustic source is activated, and the lucite refracted shear wave arrival is detected, as shown in FIG. 1b. This experiment demonstrates that by altering the acoustic properties of the wellbore fluid, a shear wave can be detected where one was not detectable previously.

In an actual field environment, the engineering of the fluid within the wellbore to have desired velocity and density characteristics is accomplished utilizing the following relationships:

The density $\rho$ of a composite fluid mixture is simply the volumetric average of the m component densities, $\rho_i$, i.e.

$$\rho = \sum_{i=1}^{m} c_i \rho_i$$

where $c_i$ is the volumetric concentration of each constituent, and $$\sum_{i=1}^{m} c_i = 1$$

The acoustic velocity V of a composite fluid mixture is determined by its effective bulk modulus K and the density $\rho$, i.e.

$$V = \left[\frac{K}{\rho}\right]^{\frac{1}{2}}.$$

The effective bulk modulus, in turn, is approximately determined by the "Reuss average" of the bulk moduli $K_i$ of the constituents, i.e.

$$K = \left[\sum_{i=1}^{m} c_i K_i^{-1}\right]^{-1}.$$

By way of example only, consider a two-component (m=2) fluid mixture where one of the components, say component 2, has a density less than that of component 1, i.e., $\rho_2 < \rho_1$, and a bulk modulus much less than that of component 1, i.e., $K_2 << K_1$. Then, for concentrations ($c_2$) of component 2 much less than 1, the above equations yield the following approximate results for the mixture density and bulk modulus:

$$\rho \simeq (1 - c_2) \cdot \rho_1$$

$$K \simeq \frac{1}{c_2} \cdot K_2$$

That is, for a given concentration $c_2$, the mixture has a density determined primarily by the density of component 1, and a bulk modulus determined primarily by the bulk modulus of component 2. This behavior, as a function of component 2 volume concentration $c_2$, is shown in FIG. 2. The corresponding acoustic velocity behavior is also shown in FIG. 2. It is now apparent that, in principle, the acoustic velocity of a fluid can be altered dramatically, while the density of that fluid remains relatively unchanged, by mixing it with a second fluid having the desired compressibility characteristics.

Figure 3:
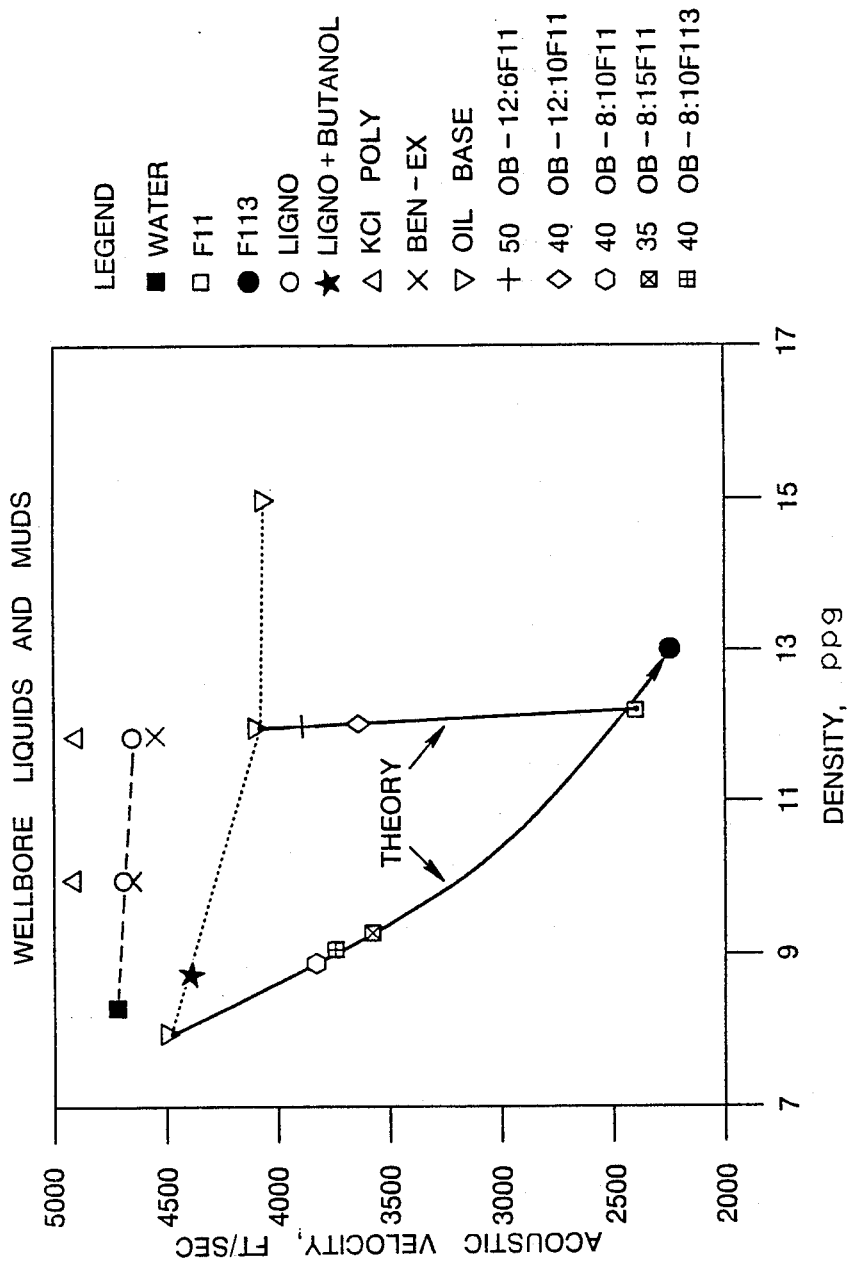
FIG. 3 is a graphical representation of the relationships of density to acoustic velocity for various wellbore fluids.

FIG. 3 shows a graphical representation of various water-based wellbore fluids, as well as oil-based wellbore fluids, densities and acoustic velocities. See Table I for an explanation of the Legend. In viewing FIG. 3 it should be understood that normally the shear velocity is approximately one-half of the compressional velocity. Therefore, a wellbore fluid of pure water (which has an acoustic velocity of approximately 5000 ft/sec.) can only be utilized to obtain shear velocities from a formation where the compressional velocity of the formation is greater than about 10,000 ft/sec. A wellbore fluid made totally of liquid Freon would allow the acquisition of shear velocities in formations whose compressional wave velocity is as low as approximately 4500 ft/sec.

Various additives, other than Freon, can be used to accomplish the above described objectives. For water-based wellbore fluids, the additives can include, but not be limited to, lignosulfonates and/or surfactants. For oil-based wellbore fluids, fluorocarbons (gaseous or liquid), hydrocarbon liquids, and surfactants can be used.

TABLE I

Water = pure distilled water
F 11 = liquid Freon 11
F 113 = liquid Freon 113
Ligno = a water based fluid containing lignosulfonate, such as 10 ppg mud made from:

| | |
|---|---|
| Water | 315.2 gm |
| Bentonite Clay | 21.2 gm |
| Simulated Drill Solids | 16.96 gm |
| Lignosulphonate | 2.68 gm |
| Lignite | 1.33 gm |
| Caustic | 0.66 gm |
| Barite | 60.69 gm |

Ligno + Butanol = a water based fluid containing 15 parts of tertiary butanol and 35 parts of a 12 ppg water based mud made from:

| | |
|---|---|
| Water | 287.5 gm |
| Bentonite Clay | 18.0 gm |
| Simulated Drill Solids | 15.31 gm |
| Lignosulphonate | 5.22 gm |
| Lignite | 2.61 gm |
| Caustic | 1.30 gm |
| Barite | 174.31 gm |

KCl Poly = a water based fluid containing KCl and a polymer, such as 10 ppg mud made from:

| | |
|---|---|
| Water | 335.06 gm |
| KCl | 37.0 gm |
| Polymer (Kla-Free) | 1.5 gm |
| Barite | 60.0 gm |

Ben-ex = a water based fluid containing a bentonite clay extending agent, such as a 10 ppg mud made from:

| | |
|---|---|
| Water | 309.4 gm |
| Bentonite Clay | 14.3 gm |
| 1% Extending Agent | 11.01 gm |
| 10% SPA Solution | 2.0 gm |
| Barite | 83.8 gm |

Oil Base = an oil based fluid, such as diesel fuel with other additives.
50 OB-12:6 Fll = an oil based fluid containing a fluorocarbon, such as a 12 ppg mud made from:

| | |
|---|---|
| Diesel No. 2 | 231.0 cc |
| Invermul | 6.0 gm |
| Lime | 3.0 gm |
| Duratone HT | 6.0 gm |
| Water | 50.75 gm |
| Geltone II | 1.0 gm |

TABLE I-continued

| | |
|---|---|
| EZ Mul | 1.0 gm |
| Barite | 230.0 gm |
| CaCl$_2$ 2H$_2$O | 31.7 gm | wherein 50 cc of the above 12 ppg mud has 6 cc of liquid Freon 11 added thereto.

40 OB-12:10 Fll = an oil based fluid containing a fluorocarbon, such as the 12 ppg mud above wherein 40 cc of the 12 ppb mud has 10 cc of liquid Freon 11 added thereto.

40 OB-8:10 Fll = an oil based fluid containing a fluorocarbon, such as a 8 ppg mud made from:

| | |
|---|---|
| Diesel No. 2 | 274.4 cc |
| Invermul | 6.0 gm |
| Lime | 3.0 gm |
| Duratone HT | 6.0 gm |
| Water | 60.0 gm |
| Geltone II | 1.0 gm |
| EZ Mul | 1.0 gm |
| CaCl$_2$ 2H$_2$O | 39.74 gm | wherein 40 cc of the 8 ppg mud has 10 cc of liquid Freon 11 added thereto.

35 OB-8:15 Fll = 35 cc of the 8 ppg oil based mud described above and 15 cc of liquid Freon 11.

40 OB-8:10 F113 = 40 cc of the 8 ppg oil based mud described above and 10 cc of liquid Freon 113.

In one embodiment of the method, a wellbore is drilled and is logged by putting an acoustic logging tool (such as a sonic wavetrain logging tool, as is well known in the art) into the wellbore. The device is activated and the logging signals are received and reviewed at the surface to determine if a signal representative of the shear velocity at the depth of interest is obtained. If not, then the operators can conclude that the acoustic velocity of the wellbore fluid is greater than the shear velocity of the formation at the depth of the tool. Thus, the operators either completely remove the wellbore fluid and add a lower acoustic velocity fluid, or they isolate the interval where the acoustic tool is located and fill that isolated interval with new fluid or altered fluid, or they introduce into the wellbore a material, such as particulate material, gas and/or liquid to reduce the acoustic velocity of the wellbore fluid. Thereafter, the formation is relogged, by activating the tool, to obtain a signal representative of the shear velocity of the formation.

Another method of the present invention is to estimate in advance the shear velocity of the formation utilizing core samples, seismic data, or other well known techniques. If the acoustic velocity of the wellbore fluid is greater than or equal to the estimated shear velocity of the formation, the acoustic velocity of the fluid (before the tool is run) is adjusted to be below the acoustic velocity of the formation. After that, the formation is logged as is customary.

Whereas the present invention has been described in particular relation to the drawings attached hereto, it should be understood that other and further modifications, apart from those shown or suggested herein, may be made within the scope and spirit of the present invention.

What is claimed is:

1. A method of logging a subterranean formation traversed by a fluid-containing wellbore, comprising:
   (a) logging the formation from within the wellbore to obtain a signal representative of the shear velocity of the formation,
   (b) if no shear velocity signal is obtainable, adding a liquid into the wellbore to lower the acoustic velocity of the wellbore fluid until a shear velocity signal is obtainable while maintaining the density of the wellbore fluid, and
   (c) logging the formation from within the wellbore to obtain a signal representative of the shear velocity of the formation.

2. The method of claim 1 wherein the liquid added to the wellbore is selected from the group consisting of liquid Freon, lignosulfonates, surfactants, and liquid hydrocarbons.

* * * * *